US008545995B2

(12) United States Patent
Kuzmenko

(10) Patent No.: US 8,545,995 B2
(45) Date of Patent: Oct. 1, 2013

(54) SYSTEMS HAVING OPTICAL ABSORPTION LAYER FOR MID AND LONG WAVE INFRARED AND METHODS FOR MAKING THE SAME

(75) Inventor: Paul J. Kuzmenko, Livermore, CA (US)

(73) Assignee: Lawrence Livermore national Security, LLC., Livermore, CA (US)

( * ) Notice: Subject to any disclaimer, the term of this patent is extended or adjusted under 35 U.S.C. 154(b) by 960 days.

(21) Appl. No.: 12/637,638

(22) Filed: Dec. 14, 2009

(65) Prior Publication Data
US 2011/0141556 A1 Jun. 16, 2011

(51) Int. Cl.
B32B 33/00 (2006.01)
B32B 37/14 (2006.01)

(52) U.S. Cl.
USPC .......................... 428/688; 427/162; 252/587

(58) Field of Classification Search
USPC .............. 359/359–360; 428/411.1, 543, 688; 252/587; 427/162
See application file for complete search history.

(56) References Cited

U.S. PATENT DOCUMENTS

| 4,444,805 A * | 4/1984 | Corbett et al. ................. 427/577 |
| 4,840,442 A * | 6/1989 | Mouchart et al. ............. 359/359 |
| 5,989,693 A * | 11/1999 | Yamasaki et al. ............. 428/216 |
| 7,444,955 B2 | 11/2008 | Boardman et al. ............. 118/723 |
| 2002/0051286 A1 * | 5/2002 | Blitstein ....................... 359/350 |
| 2003/0134122 A1 * | 7/2003 | Wickboldt et al. ........ 428/411.1 |
| 2005/0257744 A1 | 11/2005 | Boardman et al. ............. 118/723 |
| 2006/0198965 A1 | 9/2006 | Tudhope et al. ............... 427/569 |
| 2008/0315101 A1 * | 12/2008 | Sung et al. ................... 250/338.4 |
| 2012/0161090 A1 * | 6/2012 | Zhu et al. ....................... 252/587 |
| 2012/0276743 A1 * | 11/2012 | Won et al. ..................... 438/694 |
| 2013/0010275 A1 * | 1/2013 | Medvedev et al. .............. 355/71 |
| 2013/0137324 A1 * | 5/2013 | Tang ............................. 442/131 |

OTHER PUBLICATIONS

T. Tomaru et al., "Study of optical dumpers used in high vacuum system of interferometric gravitational wave detectors" Journal of Physics: Conference Series 32 (2006) 476-481.
R. Takahashi et al., "Application of diamond-like Carbon (DLC) coatings for gravitational wave detectors" Vacuum 73 (2004) 145-148, www.elsevier.com/locate/vacuum.

* cited by examiner

Primary Examiner — Mark Consilvio
(74) Attorney, Agent, or Firm — Dominic M. Kotab

(57) ABSTRACT

An optical system according to one embodiment includes a substrate; and an optical absorption layer coupled to the substrate, wherein the optical absorption layer comprises a layer of diamond-like carbon, wherein the optical absorption layer absorbs at least 50% of mid wave infrared light (3-5 µm wavelength) and at least 50% of long wave infrared light (8-13 µm wavelength). A method for applying an optical absorption layer to an optical system according to another embodiment includes depositing a layer of diamond-like carbon of an optical absorption layer above a substrate using plasma enhanced chemical vapor deposition, wherein the optical absorption layer absorbs at least 50% of mid wave infrared light (3-5 µm wavelength) and at least 50% of long wave infrared light (8-13 µm wavelength). Additional systems and methods are also presented.

20 Claims, 2 Drawing Sheets

SYSTEMS HAVING OPTICAL ABSORPTION LAYER FOR MID AND LONG WAVE INFRARED AND METHODS FOR MAKING THE SAME

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to optical systems, and more particularly to embodiments of optical absorption layers in optical systems.

BACKGROUND

Infrared instruments (e.g., detectors, cameras, spectrometers, hyperspectral imagers, etc.) require black absorptive coatings on internal surfaces to trap scattered and stray photons in order to achieve better results. This black absorptive coating is typically accomplished by applying any one of a number of black paints. Although paints are inexpensive and simple to apply, they have several disadvantages. Paints can be fragile and difficult to clean. When subjected to temperature extremes, hot and/or cold, they can flake or shed particles. Also, uniform application may be difficult on small assemblies. And most importantly in many contexts, black paints have poor vacuum performance, and require prolonged baking to reduce outgassing.

Most high performance infrared detectors operate at cryogenic temperatures and hence must be installed in a vacuum dewar to prevent condensation and to reduce the heat load to a manageable level. For laboratory applications, the vacuum is typically supplied by a mechanical pump. For field applications and especially on mobile platforms this method of supplying a vacuum is not practical. Instead, field dewars are sealed off and incorporate getter pumps (e.g., Ion Getter Pumps) of limited capacity to maintain the vacuum.

Therefore, an absorptive coating that limits or eliminates some or all of the problems associated with black paints would be very beneficial to applications using infrared instruments.

SUMMARY

An optical system according to one embodiment includes a substrate; and an optical absorption layer coupled to the substrate, wherein the optical absorption layer comprises a layer of diamond-like carbon, wherein the optical absorption layer absorbs at least 50% of mid wave infrared light (3-5 µm wavelength) and at least 50% of long wave infrared light (8-13 µm wavelength).

A method for applying an optical absorption layer to an optical system according to another embodiment includes depositing a layer of diamond-like carbon of an optical absorption layer above a substrate using plasma enhanced chemical vapor deposition, wherein the optical absorption layer absorbs at least 50% of mid wave infrared light (3-5 µm wavelength) and at least 50% of long wave infrared light (8-13 µm wavelength).

Other aspects and advantages of the present invention will become apparent from the following detailed description, which, when taken in conjunction with the drawings, illustrate by way of example the principles of the invention.

DETAILED DESCRIPTION

Figure 1A:
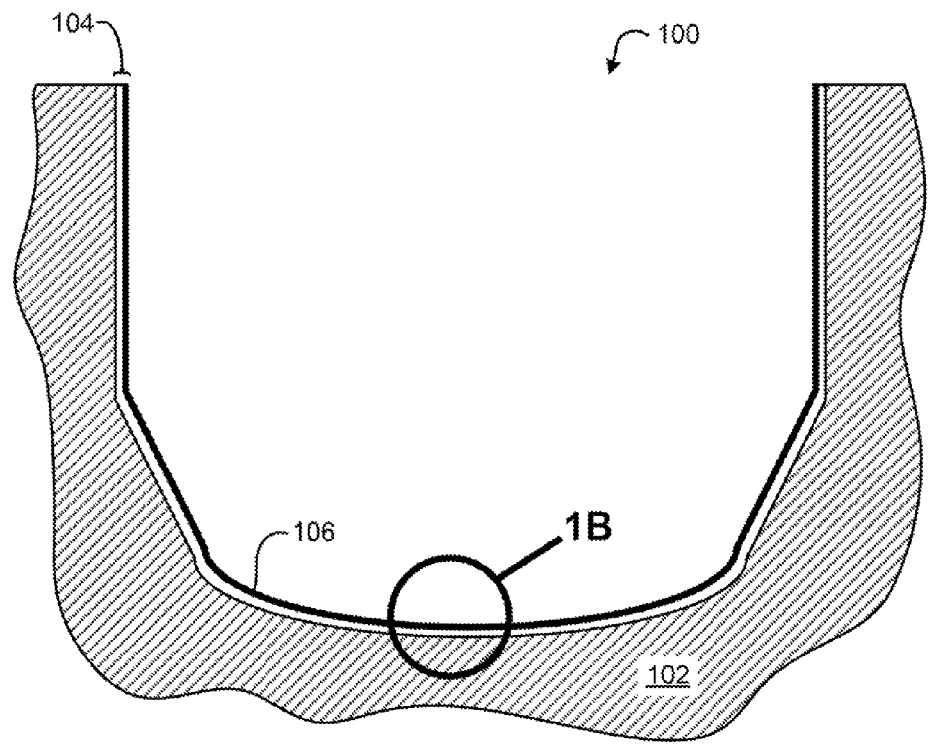
FIG. 1A shows a cross sectional view of an optical system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, an optical system includes a substrate; and an optical absorption layer coupled to the substrate, wherein the optical absorption layer comprises a layer of diamond-like carbon, wherein the optical absorption layer absorbs at least 50% of mid wave infrared light (3-5 µm wavelength) and at least 50% of long wave infrared light (8-13 µm wavelength).

In another general embodiment, a method for applying an optical absorption layer to an optical system includes depositing a layer of diamond-like carbon of an optical absorption layer above a substrate using plasma enhanced chemical vapor deposition, wherein the optical absorption layer absorbs at least 50% of mid wave infrared light (3-5 µm wavelength) and at least 50% of long wave infrared light (8-13 µm wavelength).

One purpose of this invention, in some embodiments, is to achieve high optical absorption over a broad infrared region relative to a single layer diamond-like carbon (DLC) coating that has several useful properties (e.g., extremely low outgassing in a vacuum environment, scratch and corrosion resistance, and resistance to flaking and chipping caused by temperature cycling to cryogenic temperatures). Such a "black" coating on the internal surfaces of infrared instrumentation is very useful for controlling scattered and stray light, and thus improves the usability of infrared instrumentation.

There are several innovations, disclosed below, that increase the optical absorption of several embodiments over that of single layer DLC.

First, DLC is actually a family of materials whose properties vary with the ratio of graphite-like sp2 carbon bonds to true diamond-like sp3 carbon bonds. This ratio of graphite-like sp2 carbon bonds to true diamond-like sp3 carbon bonds may be controlled, for example by adjusting the mix of deposition gases and the plasma excitation in a plasma enhanced chemical vapor deposition (PECVD) process.

Second, various embodiments include deposition of layers of other materials beneath the DLC that have large infrared absorptivity (e.g., silicon nitride, silicon carbide, etc.), so that the outer layer of DLC provides good vacuum performance while the inner layers provide good infrared absorption, makes the coating "blacker" over a broader spectral region than single layer DLC.

Third, PECVD allows for continuous control of the composition of the deposited material. This may be used to minimize reflections of light and energy at abrupt layer interfaces. While conventional PECVD may be used, better coverage over internal surfaces may be achieved by using a hollow cathode discharge process similar to those disclosed in U.S. Pat. No. 7,444,955 and U.S. Pat. Appl. Pub. No. US2006/0198965A1, which are hereby incorporated by reference.

Figure 1B:
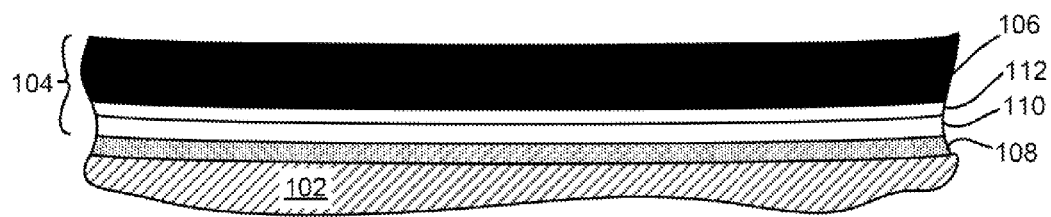
FIG. 1B shows a portion of an optical system taken from Circle 1B in FIG. 1A according to one embodiment.

Now referring to FIGS. 1A-1B, an optical system 100 may be described according to one embodiment. Many other embodiments of the optical system are possible, and this description is not meant to be limiting in any way. As shown in FIG. 1A, the optical system includes a substrate 102 and an optical absorption layer 104 coupled to the substrate 102. The substrate 102 generally may be formed prior to any other layer of the optical system 100. In addition, the substrate 102 may be formed of any material known to one of ordinary skill in the relevant art, such as alumina, metals such as aluminum, alloys such as steel and stainless steel, carbon, etc. In some embodiments, the substrate 102 may also be part of a larger apparatus or device, such as an internal surface of an infrared light detecting device, an infrared instrument, etc.

The optical absorption layer 104 comprises a layer of diamond-like carbon (DLC) 106 and absorbs at least 50% of mid wave infrared light (about 3-5 µm wavelength) and at least 50% of long wave infrared light (about 8-13 µm wavelength).

In embodiments in which the substrate 102 is an internal surface of an infrared instrument, the infrared instrument may be any device, such as a detector, a camera, a spectrometer, and/or a hyperspectral imager. Of course, some instruments incorporate one or more of these types of instruments, and the substrate 102 may be a part of this type of instrument as well.

According to some embodiments, the optical absorption layer 104, which includes a DLC layer 106, may be doped with fluorine for reducing a refractive index thereof. Doping a DLC layer with fluorine has surprisingly been found to reduce the refractive index of the DLC layer.

In one approach, the DLC layer 106 may have a thickness of about 0.1 µm to about 10 µm. In some other approaches, a thickness of the DLC layer 106 may be between about 0.5 µm and about 2.5 µm; in other approaches between about 0.1 µm and about 5 µm; in other approaches between about 1.0 µm and about 2.0 µm; in other approaches between about 0.1 µm and about 1.5 µm. Of course, many other ranges are possible, and the DLC layer 106 may be thicker and/or thinner than what is described here.

Also, although the DLC layer 106 is shown near the middle of the absorption layer 104, it is not so limited. The DLC layer 106 may be formed near a top and/or near a bottom of the absorption layer 104. Also, in addition to the layers described herein, other layers may be present in, above, and/or below the absorption layer 104.

In some more embodiments, the DLC layer 106 may have a deposition topography characteristic of formation by plasma enhanced chemical vapor deposition (PECVD). Such topography is very conformal to the underlying substrate, as contrasted with the shadowing effect typically found with directional deposition techniques.

According to some embodiments, as shown in FIG. 1B, a magnified view taken from Circle 1B in FIG. 1A, the optical system 100 may further comprise an adhesion layer 108 positioned between the substrate 102 and the optical absorption layer 104. However, in some approaches, the substrate 102 may have adhesive properties and/or the optical absorption layer 104 may have adhesive properties, and such embodiments may not have the adhesion layer 108. In some embodiments, no adhesion layer 108 is added regardless of the presence of other adhesive properties. Some examples of adhesion layers 108 include silicon-containing adhesives such as silicon carbide, transparent epoxies, etc.

In some approaches, as shown in FIG. 1B, the optical absorption layer 104 may further comprise an absorbing layer 110 between the substrate 102 and the DLC layer 106, the absorbing layer 110 having a higher mid wave infrared light absorption and a higher long wave infrared light absorption per unit volume at a given thickness than the DLC layer 106 has per unit volume at the same thickness as the absorbing layer 110. In some further approaches, the absorbing layer 110 may be adjacent the DLC layer 106, wherein an interface 112 between the absorbing layer 110 and the DLC layer 106 is a melding of materials from both layers rather than a sharp interface. For example, the optical absorption layer 104 may be comprised of a silicon carbide adhesion layer, a high silicon doped DLC layer, a first DLC layer, a low silicon doped DLC layer, and a top DLC layer. This is critical in some embodiments for reducing or eliminating reflections that would otherwise occur at abrupt layer interfaces. The melding of the layers is enabled by the PECVD process, which allows continuous control of the composition of the deposited material. Note, however, that other processes and/or structures may also be used to produce such an effect.

According to some more embodiments, the optical absorption layer 104 may preferably absorb at least 75% of mid wave infrared light and at least 75% of long wave infrared light. More preferably, the optical absorption layer 104 may absorb at least 90% of mid wave infrared light and at least 90% of long wave infrared light. Even higher absorption properties may also be present in the optical absorption layer 104.

Figure 2:
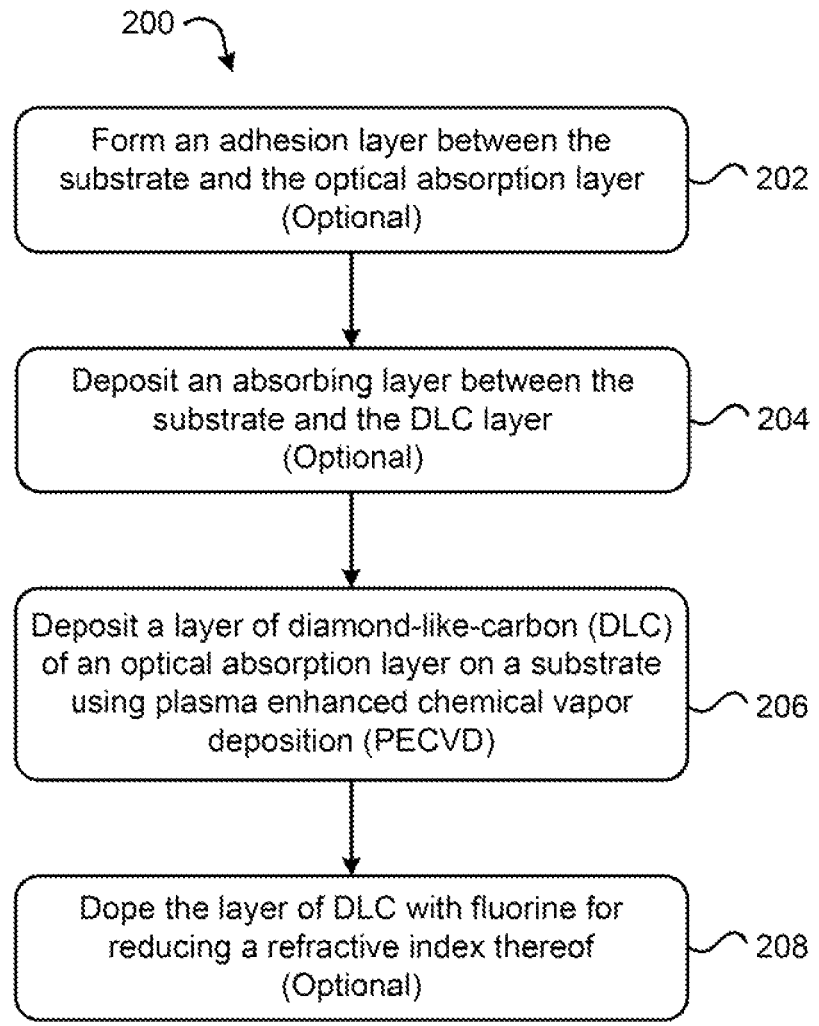
FIG. 2 shows a method for applying an optical absorption layer to an optical system according to one embodiment.

Now referring to FIG. 2, a method 200 for applying an optical absorption layer to an optical system is described. The method 200 may be carried out in any desired environment. Any of the features and embodiments described in reference to FIG. 1 may be applied to the description of method 200.

In optional operation 202, an adhesion layer may be formed above the substrate prior to forming an optical absorption layer. Of course, one or both of the substrate and the optical absorption layer may include adhesive properties. Even in these embodiments, an adhesion layer may also be used to provide for a more predictable lifetime for the coating.

In optional operation 204, an absorbing layer may be deposited above the substrate, preferably prior to forming the DLC layer. The absorbing layer may have a higher mid wave infrared light absorption and a higher long wave infrared light absorption per unit volume at a given thickness than the DLC layer has per unit volume at the same thickness as the absorbing layer.

In some further embodiments, the absorbing layer may be adjacent the DLC layer, wherein an interface between the absorbing layer and the DLC layer may be a melding of materials from both the absorbing layer and the DLC layer formed during a temporally continuous deposition process.

In operation 206, a layer of diamond-like carbon (DLC) of an optical absorption layer is deposited above a substrate using plasma enhanced chemical vapor deposition (PECVD), wherein the optical absorption layer absorbs at least 50% of mid wave infrared light (about 3-5 µm wavelength) and at least 50% of long wave infrared light (about 8-13 µm wavelength).

The substrate may be an internal surface of an infrared instrument, according to some embodiments. In illustrative embodiments, the infrared instrument may be a detector, a camera, a spectrometer, and/or a hyperspectral imager. Of course, some instruments may include two or more of the above mentioned devices, and these instruments may also constitute a surface that can be the substrate according to some embodiments.

In some embodiments, the PECVD process may employ a hollow cathode discharge. The hollow cathode effect may be used to generate and maintain an extremely high-density plasma at the surface, which can be used to form coatings and films through a PECVD process in the presence of certain precursor gases.

According to some preferred embodiments, the optical absorption layer may absorb at least 75% of mid wave infrared light and at least 75% of long wave infrared light. Even more preferably, the optical absorption layer may absorb at least 90% of mid wave infrared light and at least 90% of long wave infrared light.

In optional operation 208, the layer of DLC may be doped with fluorine for reducing a refractive index thereof. The DLC layer may also be doped with other elements and/or molecules to create different characteristics of the doped DEC layer, as would be known to one of skill in the relevant art.

One or more embodiments of the present invention may be useful for many different applications. For example, it may be useful as a replacement for black paint in sealed liquid cryostats and/or dewars for infrared instruments (e.g., detectors, cameras, spectrometers, hyperspectral imagers, etc.) to reduce vacuum bakeout requirements and to provide extended vacuum lifetime. In addition, the invention may be useful as a coating for a black body emitter/calibration source in dirty environments. In these applications, the surface would be cleanable without damaging or reducing the emissivity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An optical system, comprising:
   a substrate; and
   an optical absorption layer coupled to the substrate,
   wherein the optical absorption layer comprises a layer of diamond-like carbon,
   wherein the optical absorption layer absorbs at least 50% of mid wave infrared light (3-5 μm wavelength) and at least 50% of long wave infrared light (8-13 μm wavelength).

2. The system of claim 1, wherein the substrate is an internal surface of an infrared instrument.

3. The system of claim 2, wherein the infrared instrument is selected from a group consisting of a detector, a camera, a spectrometer, and a hyperspectral imager.

4. The system of claim 1, wherein the layer of diamond-like carbon is doped with fluorine for reducing a refractive index thereof.

5. The system of claim 1, wherein the layer of diamond-like carbon has a deposition topography characteristic of formation by plasma enhanced chemical vapor deposition.

6. The system of claim 1, further comprising an adhesion layer positioned between the substrate and the optical absorption layer.

7. The system of claim 1, wherein the optical absorption layer further comprises an absorbing layer between the substrate and the diamond-like carbon layer, the absorbing layer having a higher mid wave infrared light absorption and a higher long wave infrared light absorption than the diamond-like carbon.

8. The system of claim 7, wherein the absorbing layer is adjacent the diamond-like carbon layer, wherein an interface between the absorbing layer and the diamond-like carbon layer is a melding of materials from both layers.

9. The system of claim 1, wherein the optical absorption layer absorbs at least 75% of mid wave infrared light and at least 75% of long wave infrared light.

10. The system of claim 1, wherein the optical absorption layer absorbs at least 90% of mid wave infrared light and at least 90% of long wave infrared light.

11. A method for applying an optical absorption layer to an optical system, the method comprising:
    depositing a layer of diamond-like carbon of an optical absorption layer above a substrate using plasma enhanced chemical vapor deposition,
    wherein the optical absorption layer absorbs at least 50% of mid wave infrared light (3-5 μm wavelength) and at least 50% of long wave infrared light (8-13 μm wavelength).

12. The method of claim 11, wherein the plasma enhanced chemical vapor deposition process employs a hollow cathode discharge.

13. The method of claim 11, wherein the substrate is an internal surface of an infrared instrument.

14. The method of claim 13, wherein the infrared instrument is selected from a group consisting of a detector, a camera, a spectrometer, and a hyperspectral imager.

15. The method of claim 11, further comprising doping the layer of diamond-like carbon with fluorine for reducing a refractive index thereof.

16. The method of claim 11, further comprising forming an adhesion layer between the substrate and the optical absorption layer.

17. The method of claim 11, further comprising depositing an absorbing layer between the substrate and the diamond-like carbon layer, the absorbing layer having a higher mid wave infrared light absorption and a higher long wave infrared light absorption than the diamond-like carbon.

18. The method of claim 17, wherein the absorbing layer is adjacent the diamond-like carbon layer, wherein an interface between the absorbing layer and the diamond-like carbon layer is a melding of materials from both the absorbing layer and the diamond-like carbon layer formed during a temporally continuous deposition process.

19. The method of claim 11, wherein the optical absorption layer absorbs at least 75% of mid wave infrared light and at least 75% of long wave infrared light.

20. The method of claim 11, wherein the optical absorption layer absorbs at least 90% of mid wave infrared light and at least 90% of long wave infrared light.

* * * * *